US012438873B2

(12) United States Patent
Maghnani et al.

(10) Patent No.: US 12,438,873 B2
(45) Date of Patent: Oct. 7, 2025

(54) SYSTEM AND METHOD FOR AUTHENTICATION OF DEVICE TRANSFERS IN A DISTRIBUTED NETWORK

(71) Applicant: BANK OF AMERICA CORPORATION, Charlotte, NC (US)

(72) Inventors: Vinod Maghnani, Haryana (IN); Sarika Agarwal, Haryana (IN); Amit Mehndiratta, New Delhi (IN); Tulasi Bhavani Nekkanti, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 251 days.

(21) Appl. No.: 18/232,628

(22) Filed: Aug. 10, 2023

(65) Prior Publication Data
US 2025/0055841 A1 Feb. 13, 2025

(51) Int. Cl.
*H04L 9/40* (2022.01)
*H04B 10/70* (2013.01)

(52) U.S. Cl.
CPC ........ *H04L 63/0846* (2013.01); *H04B 10/70* (2013.01)

(58) Field of Classification Search
CPC .. H04L 63/0846; H04L 63/0853; H04B 10/70
See application file for complete search history.

(56) References Cited

U.S. PATENT DOCUMENTS

| 9,129,199 B2 | 9/2015 | Spodak |
| 9,177,241 B2 | 11/2015 | Spodak |
| 9,218,557 B2 | 12/2015 | Spodak |

(Continued)

FOREIGN PATENT DOCUMENTS

| EP | 2733654 A1 | 5/2014 |
| EP | 2763109 A1 | 8/2014 |

(Continued)

OTHER PUBLICATIONS

Albahbooh et al., "A Mobile Phone Device as a Biometrics Authentication Method for an ATM Terminal", Oct. 2015, IEEE International Conference on Computer and Information Technology, pp. 2017-2024. (Year: 2015).*

(Continued)

*Primary Examiner* — Kenneth W Chang
(74) *Attorney, Agent, or Firm* — Moore & Van Allen PLLC; William Walters (57) ABSTRACT

Systems, computer program products, and methods are described herein for authentication of device transfers in a distributed network. The present disclosure is configured to receive a transaction request, wherein the transaction request comprises a secondary user device, wherein the secondary user device is associated a user; create a pair of authentication codes, wherein the authentication codes are associated with a distributed network; transmit the pair of authentication codes to the secondary user device; authorize the secondary user device; activate a primary user device, wherein the primary user device is associated with the user, and wherein activating the primary user device comprises prompting the user on the primary user device to provide one or more transaction details; and complete the transaction request.

20 Claims, 5 Drawing Sheets

(56) References Cited

U.S. PATENT DOCUMENTS

| | | |
|---|---|---|
| 9,218,598 B2 | 12/2015 | Spodak |
| 9,251,513 B2 | 2/2016 | Nilsson |
| 9,317,018 B2 | 4/2016 | Spodak |
| 9,430,768 B2 | 8/2016 | Graylin |
| 9,473,295 B2 | 10/2016 | Lyne |
| 9,898,736 B2 | 2/2018 | Graylin |
| 9,904,800 B2 | 2/2018 | Spodak |
| 10,275,758 B2 | 4/2019 | Lund |
| 2012/0240195 A1* | 9/2012 | Weiss .................. H04L 63/0853 726/4 |
| 2018/0189767 A1 | 7/2018 | Bigioi |
| 2019/0303945 A1 | 10/2019 | Mitra |
| 2020/0175154 A1* | 6/2020 | Ratnakaram ............ G06F 21/54 |
| 2020/0351262 A1* | 11/2020 | McConnell .......... G06Q 20/352 |
| 2021/0287220 A1* | 9/2021 | Srinivasan ......... G06Q 20/3224 |
| 2021/0344672 A1* | 11/2021 | Drechsler .............. G06Q 20/02 |
| 2022/0351263 A1 | 11/2022 | Rule |

FOREIGN PATENT DOCUMENTS

| | | |
|---|---|---|
| JP | 5940176 B2 | 6/2016 |
| JP | 2018508091 A | 3/2018 |
| WO | 2013112839 A1 | 8/2013 |

OTHER PUBLICATIONS

Fourar, Hakim, "A Remote Authentication Model Using Smart Cards", Mar. 2006, IEEE GCC Conference, pp. 1-5 (Year: 2006).*

\* cited by examiner

SYSTEM AND METHOD FOR AUTHENTICATION OF DEVICE TRANSFERS IN A DISTRIBUTED NETWORK

TECHNOLOGICAL FIELD

Example embodiments of the present disclosure relate to authentication of device transfers in a distributed network.

BACKGROUND

There are many challenges associated with device authentication. Applicant has identified a number of deficiencies and problems associated with authentication of device transfers in a distributed network. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for authentication of device transfers in a distributed network.

Embodiments of the present invention address the above needs and/or achieve other advantages by providing apparatuses (e.g., a system, computer program product, and/or other devices) and methods for determining application degradation using advanced computational models for data analysis and automated decision-making. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention receives a transaction request, wherein the transaction request comprises a secondary user device, wherein the secondary user device is associated with a user. In some embodiments, the present invention creates a pair of authentication codes, wherein the authentication codes are associated with a distributed network. In some embodiments, the present invention transmits the pair of authentication codes to the secondary user device. In some embodiments, the present invention authorizes the secondary user device. In some embodiments, the present invention activates a primary user device, wherein the primary user device is associated with the user, and wherein activating the primary user device comprises prompting the user on the primary user device to provide one or more transaction details. In some embodiments, the present invention completes the transaction request.

In some embodiments, activating the primary user device further comprises requesting the transaction details, wherein the transaction details are associated with the transaction request. In some embodiments, activating the primary user device further comprises receiving the transaction details. In some embodiments, activating the primary user device further comprises transmitting the transaction details to an entity server.

In some embodiments, the present invention utilizes one or more quantum communication channels when receiving and transmitting information.

In some embodiments, receiving the transaction request comprises receiving the transaction request through light fidelity, wherein the light fidelity comprises a light fidelity device, and wherein the secondary user device comprises a smart card.

In some embodiments, the light fidelity comprises the primary user device.

In some embodiments, creating the pair of authentication codes further comprises requesting, from the user, one or more authentication credentials.

In some embodiments, the pair of authentication codes will expire after an expiration time period has elapsed.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Cashless societies offer flexibility in the way that users may make transactions. However, there are still geographical areas that present challenges to users attempting to transact in a cashless way, specifically where there is little to no network connection available. For example, if two users want to make a transaction at a place where no automated teller machine around and where there is no internet available, the users may not be able to carry out their transaction. Further, using resource containers at a remote location poses a chance of card misappropriation where there is no authentication procedures in place.

In some embodiments, the authentication determination system may receive a transaction request from a user. In some embodiments, the user may attempt to transact with another user, and the two users may bring their smart cards in contact and under Li-Fi. The card details of the two users may be transmitted to the nearest control tower. In some embodiments, the user details and card details may be verified at an entity (e.g., financial institution) server. Once the details are authorized, the details may be provided to a Hyperledger (e.g., distributed network). In some embodiments, the Hyperledger will create random keys for each user and may enable quantum communication on the users' mobile phones. The users will enter details associated with the transaction on their phones, which will be sent to the entity's server and initiate the transaction between the user's accounts.

What is more, the present disclosure provides a technical solution to a technical problem. As described herein, the technical problem includes the issue of secure, efficient, and effective resource transfer between secondary user devices. The technical solution presented herein allows for secure, efficient, and effective authentication of secondary user devices, which allows for resource transfer between the devices. In particular, the authentication determination system is an improvement over existing solutions for transferring resources through authenticated secondary user devices, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
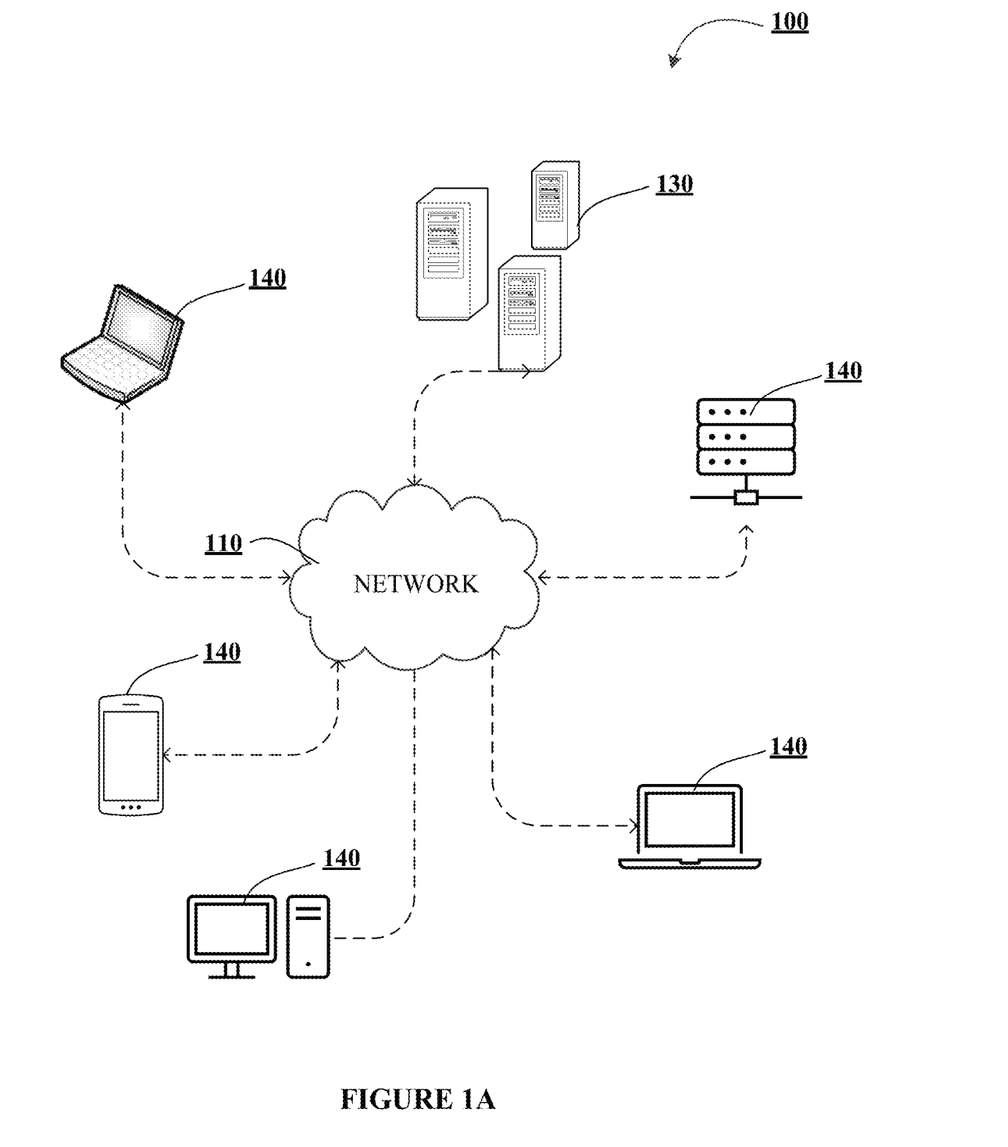
FIGS. 1A-1C illustrates technical components of an exemplary distributed computing environment for authentication of device transfers in a distributed network, in accordance with an embodiment of the disclosure.
Figure 1B:
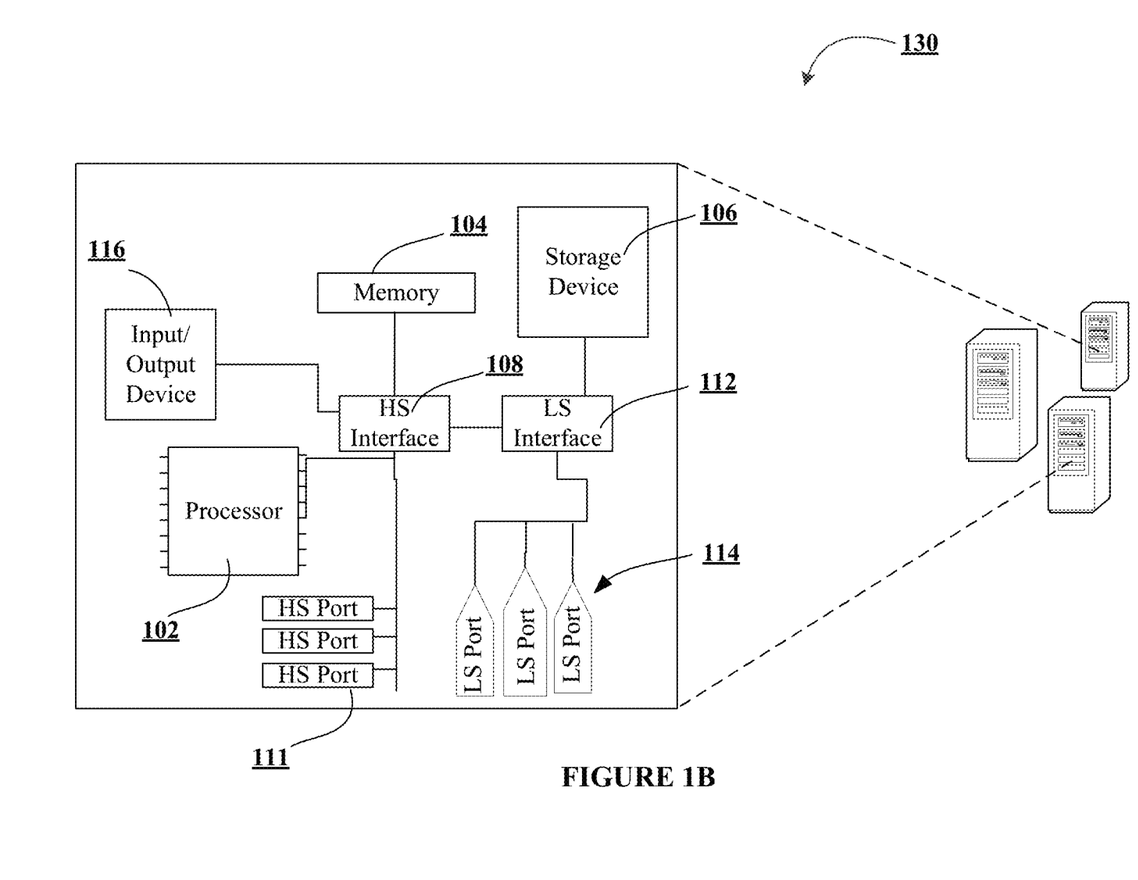
Figure 1C:
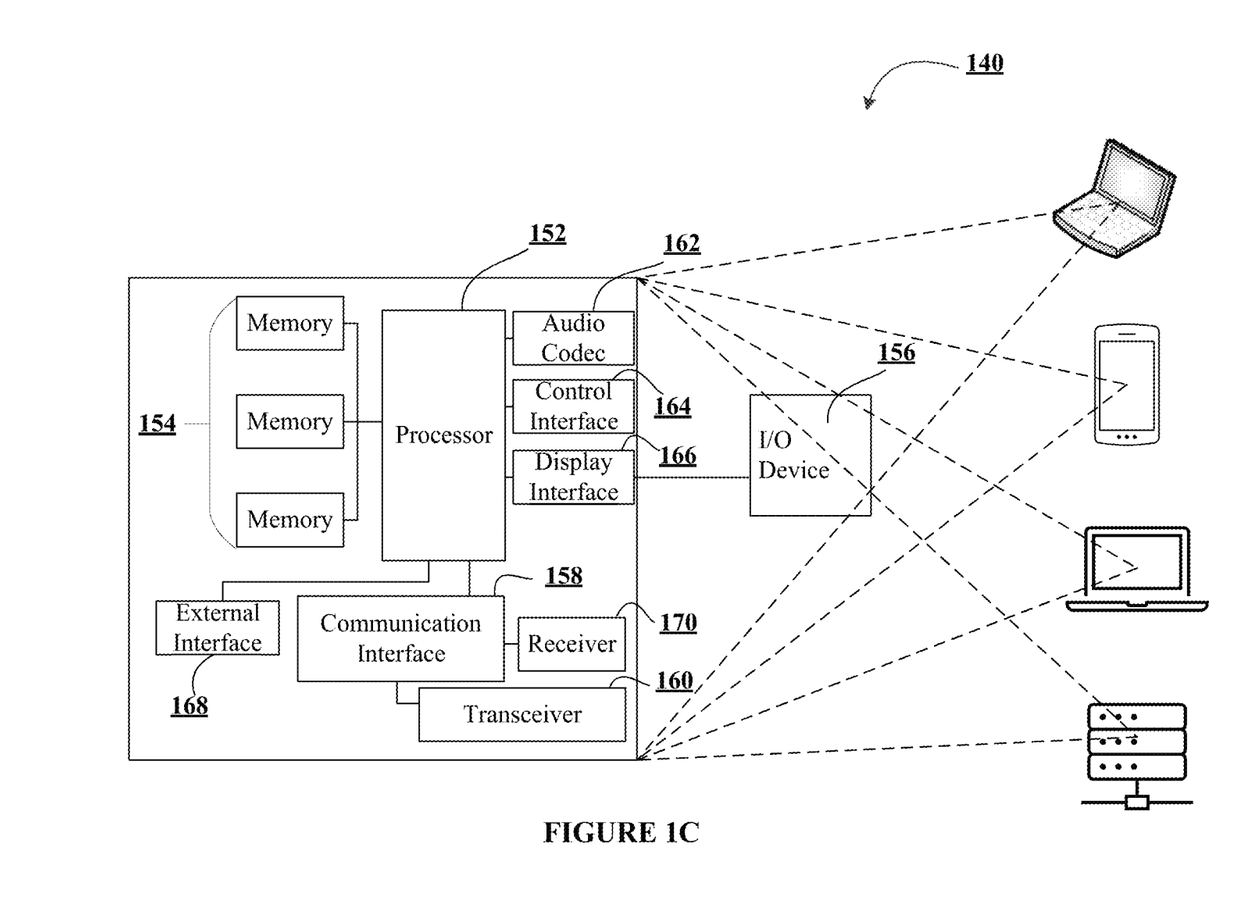

FIGS. 1A-1C illustrate technical components of an exemplary distributed computing environment 100 for authentication of device transfers in a distributed network, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

Figure 2:
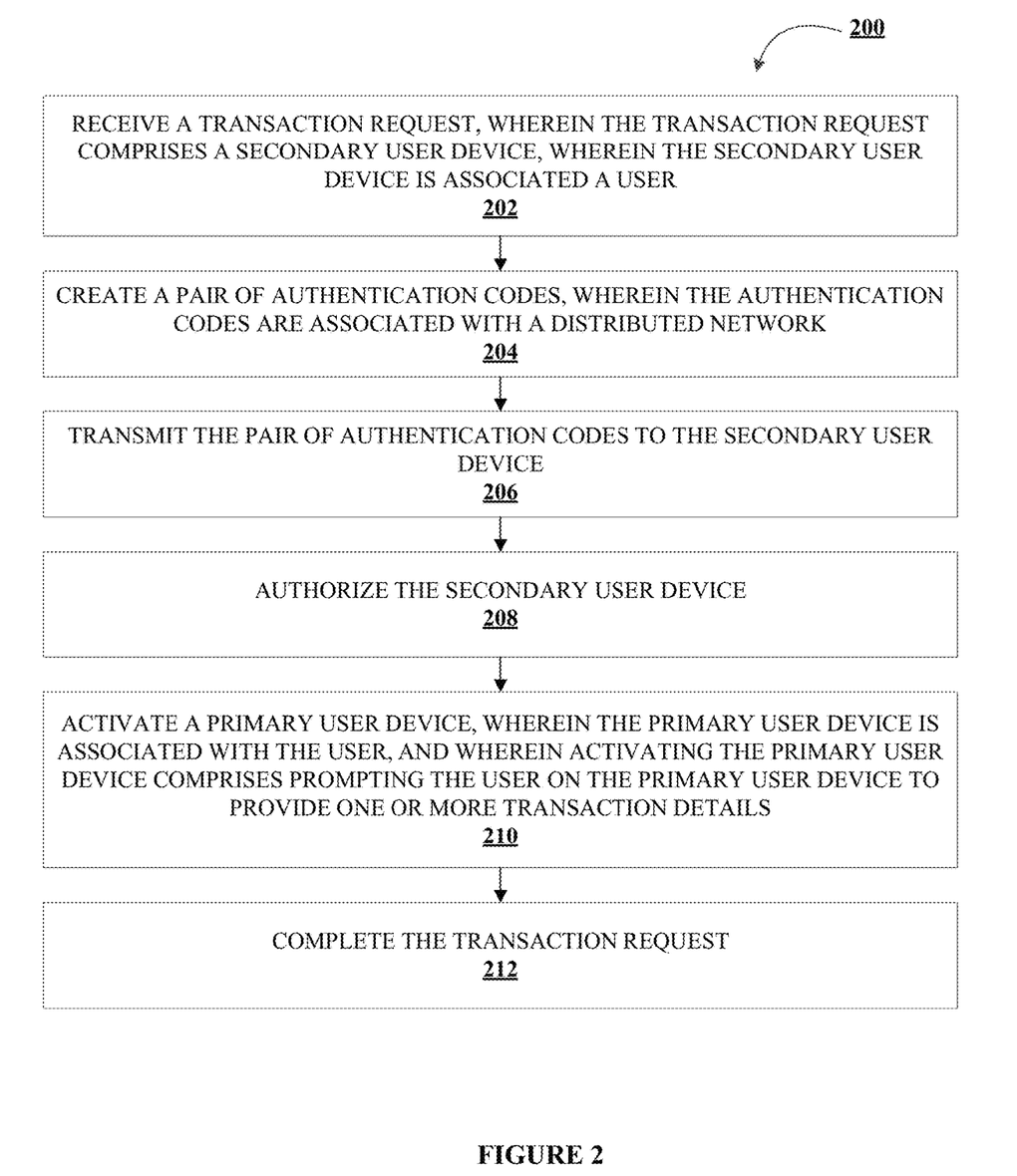
FIG. 2 illustrates a process flow for authentication of device transfers in a distributed network, in accordance with an embodiment of the disclosure.

FIG. 2 is a process flow 200 which illustrates a process flow for authentication for authentication of device transfers in a distributed network, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device containing instructions that, when executed by the processing device, causes the processing device to perform the method discussed herein.

In some embodiments, an authentication determination system (e.g., similar to one or more of the systems described herein with respect to FIGS. 1A-1C) may perform one or more of the steps of process flow 200. For example, an authentication determination system (e.g., the system 130 described herein with respect to FIGS. 1A-1C) may perform the steps of process flow 200.

As shown in block 202, the process flow 200 of this embodiment includes receiving a transaction request, wherein the transaction request comprises a secondary user device, wherein the secondary user device is associated a user. As used herein, a transaction request may include any request that relates to the transfer of resources. In some embodiments, the transaction request may include a person (e.g., user) transacting with another person (e.g., additional user). In some embodiments, the transaction request may include a person transacting with a merchant, business, kiosk, automated teller machine, and/or the like. In some embodiments, the transaction request may include the transfer of resources wherein the parties (e.g., users, entities, and/or the like) to the transaction are exchanging resources. In some embodiments, the transaction request may include the transfer of resources where one party (e.g., user) is transferring resources without receiving any resources from the other one or more parties (e.g., other users, entities, and/or the like).

As used herein, a secondary user device may include a smart card, an integrated circuit card (ICC), chip card, and/or the like. In some embodiments, the secondary user device may be an embedded integrated circuit device that serves as a secure token of authentication, data storage, resource storage, resource transfer, and/or the like. In some embodiments, the secondary user device may include an embedded integrated circuit chip, which can be either a microcontroller with internal memory or a secure memory integrated circuit that can manage, store, and control access to data securely. In some embodiments, the secondary user device may interface with other devices (e.g., other smart cards, card readers, kiosks, merchant stations, ATMs, and/or the like) through light fidelity (Li-Fi) technology, wireless fidelity (Wi-Fi) technology, radio frequency identification (RFID) technology, near-field communication (NFC) technology, and/or the like.

In some embodiments, the secondary user device may be used in various applications for secure identity verification, data storage, application processing, resource management (e.g., resource storage, resource transfer, and/or the like), and/or the like. In this way, the secondary user device may be used for financial transactions.

In some embodiments, receiving the transaction request comprises receiving the transaction request through light fidelity, wherein the light fidelity comprises a light fidelity device, and wherein the secondary user device comprises a smart card.

In some embodiments, the light fidelity device comprises the primary user device.

As shown in block 204, the process flow 200 of this embodiment includes creating a pair of authentication codes, wherein the authentication codes are associated with a distributed network. As used herein, a pair of authentication codes may include any codes that may be used for authentication. In some embodiments, the authentication codes may include a secure key distribution. In some embodiments, the authentication codes may include cryptographic signature, hash, and/or the like which may be derived from an algorithm, such as SHA-256, or the like. In some embodiments, the authentication codes may be computed based on information known both to the device (e.g., secondary user device) and the distributed network (e.g., Hyperledger). In some embodiments, private keys or public keys may be used.

A distributed network may include using a Hyperledger. In some embodiments, the Hyperledger (e.g., distributed network) may be used for secure key (e.g., authentication code) distribution and for authenticating a user through random bit distribution before initiating any transaction.

In some embodiments, the pair of authentication codes will expire after an expiration time period has elapsed. For instance, and by way of non-limiting example, the authentication codes may expire after one, two, three, four, five, six, seven, eight, nine, or ten minutes. In some embodiments, a user initiating the transaction may control the length of the expiration time period. In some embodiments, a financial institution associated with the authentication determination system may control the length of the expiration time period.

As shown in block 206, the process flow 200 of this embodiment includes transmitting the pair of authentication codes to the secondary user device. In some embodiments, the authentication codes may be transmitted over secure communications. In some embodiments, the authentication codes may be transmitted over a quantum communications channel.

As shown in block 208, the process flow 200 of this embodiment includes authorizing the secondary user device. In some embodiments, creating the pair of authentication codes further comprises requesting, from the user, one or more authentication credentials. In some embodiments, authorizing the secondary user device may include receiving authentication credentials from the user. In some embodiments, and as stated above, "authentication credentials" may be any information that can be used to identify of a user.

In some embodiments, the authentication credentials may include knowledge-based credentials, possession-based credentials, biometric credentials, geographical-based credentials, and/or the like. In some embodiments, knowledge-based credentials may include information known to the user such as passwords, PINs, responses to security questions, and/or the like. In some embodiments, possession-based credentials may include physical or digital items possessed by the user that authenticate the user's identity such as security tokens, smart cards (e.g., similar to the secondary user device), mobile phones (e.g., similar to the primary user device), and/or the like. In some embodiments, biometric credentials may include unique biological or behavioral traits of a user for authentication, such as fingerprints, retina patterns, facial recognition, voice recognition, behavioral characteristics (e.g., specific bodily movement patterns, typing patterns, etc.), and/or the like. In some embodiments, geographical-based credentials may include determining the user's geographical location as an authentication favor, wherein the system may use the user's internet protocol (IP) address, media access control (MAC) address, longitude and latitude, and/or the like. In some embodiments, the authentication determination system (e.g., system 130) may use one or more authentication procedures listed above.

As shown in block 210, the process flow 200 of this embodiment includes activating a primary user device, wherein the primary user device is associated with the user, and wherein activating the primary user device comprises prompting the user on the primary user device to provide one or more transaction details. As used herein, a primary user device may include any device associated with the user. In some embodiments, the primary user device may include a mobile phone, a personal computer, a computer tablet, a smart watch, a headset computing device (e.g., a virtual reality headset, an augmented reality headset, and/or the like), and/or the like.

As used herein, prompting the user may include requesting the user to provide the one or more transaction details. In some embodiments, the request may come in a variety of forms. In some embodiments, the request may include push notifications, a prompt on the user device, a prompt within an application on the user device, an email, a text message (e.g., short message service (SMS), multimedia messaging service (MMS), rich communication services (RCS), over-the-top messaging (OTT), enterprise messaging services, and/or the like), a phone call, a video conference call, and/or the like.

As used herein, one or more transaction details may refer to the transaction details of the transaction in question. In some embodiments, activating the primary user device further comprises requesting the transaction details, wherein the transaction details are associated with the transaction request. In some embodiments, the transaction details may include the resource amount, the payee information (e.g., the party receiving the resources), the payor information (e.g., the party sending the resources), the date of the transaction, the time of the transaction, the location of the transaction, the number of resource payments to be made (e.g., similar to a payment plan), the length of time associated with the number of resource payments to be made (e.g., time required for the payment plan), any interest associated with the resource transaction, notes or comments relating to the transaction, and/or the like.

In some embodiments, activating the primary user device further comprises receiving the transaction details.

In some embodiments, activating the primary user device further comprises transmitting the transaction details to an entity server. In some embodiments, the entity server may be associated with a financial institution. In some embodiments, the financial institution may be associated with one or more parties (e.g., users, entities, businesses, corporations, merchants, and/or the like) of the transaction.

In some embodiments, the authentication determination system may authorize the primary user device, wherein authorizing the primary user device includes requesting authentication credentials from the user. In some embodiments, authorizing the primary user device may be similar to authorizing the secondary user device.

As shown in block 212, the process flow 200 of this embodiment includes completing the transaction request. In some embodiments, completing the transaction request may include processing the resource transfer. In some embodiments, the entity server may complete the resource transfer. In some embodiments, the authentication determination system may generate a transaction completion interface component. In some embodiments, the transaction completion interface component may configure a graphical user interface of the user device (e.g., the primary user device, the secondary user device, a third-party user device, and/or the like). In some embodiments, the transaction completing interface component may include data associated with the transaction in question, such as the resource amount transferred, the parties to the transaction, the date and time of the transaction, the location of the transaction, the identification of the secondary user device(s) used during the transaction, the identification of the primary user device(s) used during the transaction, and/or the like.

In some embodiments, executing the instructions further causes the processing device to utilize one or more quantum communication channels when receiving and transmitting information. In some embodiments, the quantum communication channel may include a transmitter device (e.g., similar to transceiver 160 in FIG. 1C), a receiver device (e.g., similar to transceiver 160 and receiver 170 in FIG. 1C), a quantum channel established between the transmitter and receiver, and/or the like. In some embodiments, the quantum channel may use optical fibers, free-space optical links, or any other transmission medium suitable for the propagation of quantum states. In some embodiments, the authentication determination system may use quantum cryptographic protocols to secure the quantum communication against malicious attacks, such as eavesdropping. In some embodiments, the quantum channel may be extended to a quantum network, wherein the quantum network may include one or more devices connected through quantum channels. In some embodiments, the quantum network may include the primary user device, the secondary user device, the entity server, the distributed network, any other device connected to the authentication determination system, and/or the like.

Figure 3:
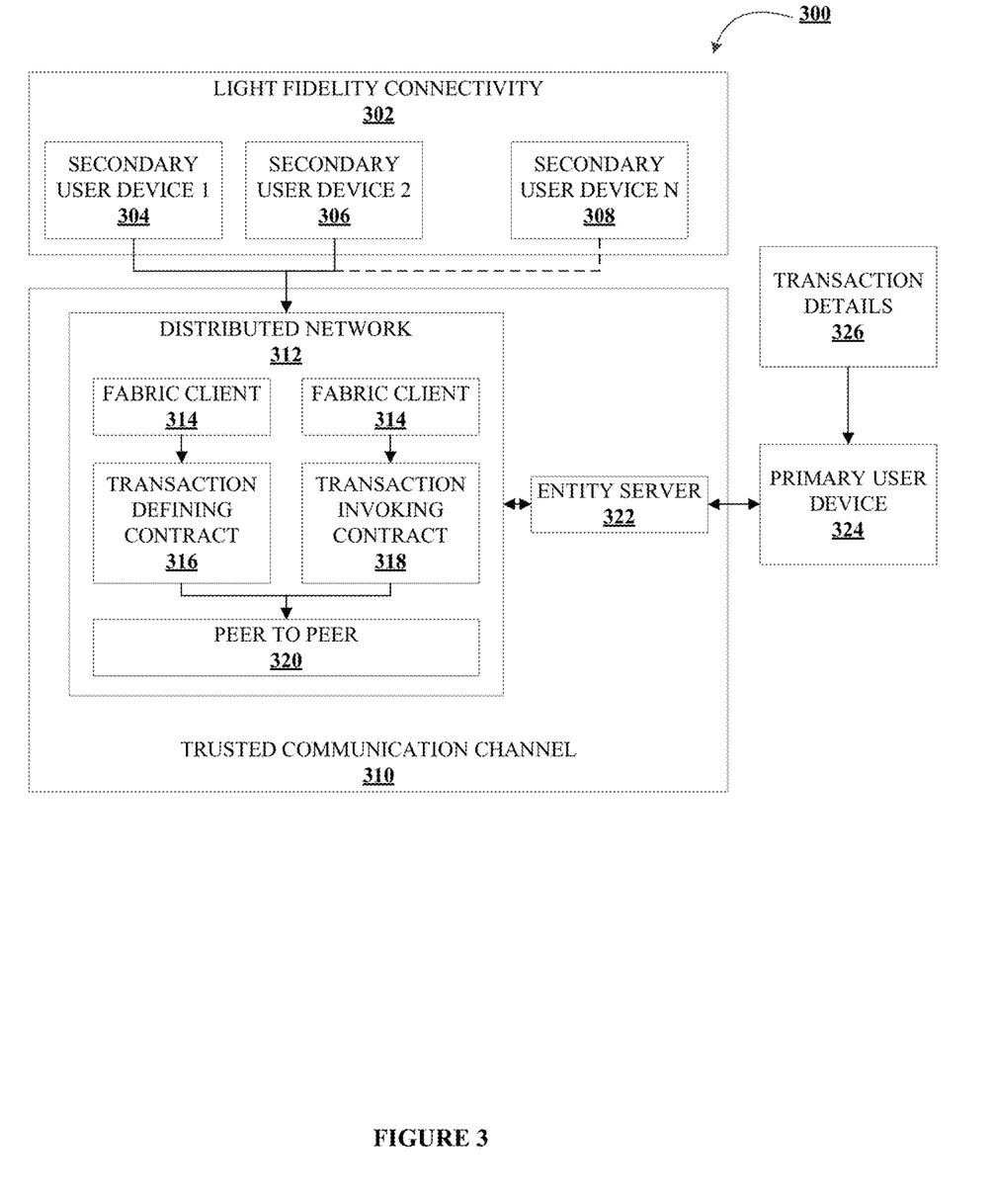
FIG. 3 illustrates a process flow of an example process associated with example embodiments described herein.

FIG. 3 is a process flow 300 which illustrates a process flow an example process associated with example embodiments described herein, in accordance with an embodiment of the disclosure. The method may be carried out by various components of the distributed computing environment 100 discussed herein (e.g., the system 130, one or more endpoint device(s) 140, etc.). An example system may include at least one processing device and at least one non-transitory storage device containing instructions that, when executed by the processing device, causes the processing device to perform the method discussed herein.

In some embodiments, an authentication determination system (e.g., similar to one or more of the systems described herein with respect to FIGS. 1A-1C) may perform one or more of the steps of process flow 300. For example, an authentication determination system (e.g., the system 130 described herein with respect to FIGS. 1A-1C) may perform the steps of process flow 300.

As shown in block 302, the process flow 300 of this embodiment includes light fidelity connectivity. In some embodiments, the light fidelity (Li-Fi) connectivity may include a Li-Fi producing device to provide the Li-Fi connectivity network. In some embodiments, the Li-Fi network may use light waves for data transmission. In some embodiments, the Li-Fi producing device may be a light emitting diode (LED). In some embodiments, any device that uses an LED may be used to set up the Li-Fi network. In some embodiments, a mobile phone (e.g., similar to the primary user device) may be used to set up the Li-Fi network. In some embodiments, a device equipped with an LED may be used, such as a light fixture, a lamp, a streetlight, a headlight, and/or the like.

As shown in block 304, the process flow 300 of this embodiment includes secondary user device 1. As shown in block 306, the process flow 300 of this embodiment includes secondary user device 2. As shown in block 308, the process flow 300 of this embodiment includes secondary user device N. In some embodiments, there may be any number of secondary user devices connected to the Li-Fi network.

In some embodiments, the secondary user devices may be equipped to connect with the Li-Fi network. In this way, the secondary user devices may include photo detectors capable of converting the light emitted from the LEDs into electrical signals. Further, the electric signals may then be converted into a data stream that may be interpreted by electronic devices (e.g., devices similar to the primary user device, the secondary user device, and/or the like).

As shown in block 310, the process flow 300 of this embodiment includes a trusted communication channel. In some embodiments, the trusted communication channel may include wired channels (e.g., ethernet cables, coaxial cables, fiber optic cables, and/or the like), wireless channels (e.g., Wi-Fi, Bluetooth, Infrared, Li-Fi, cellular networks, and/or the like), radio frequency channels, quantum channels, satellite channels (e.g., global positioning system, or the like), NFC, powerline communication, and/or the like. In some embodiments, the trusted communication channel may be a trusted quantum communication channel, which may include a trusted quantum communication transmitter and receiver station. In some embodiments, the one or more components of the authentication determination system may be connected to the trusted communication channel. In some embodiments, the type of communication channel between the different communications may vary and may include combinations of the differing types of communication channels. For instance, and by way of non-limiting example, the communication between the distributed network 312 and the entity server 322 may be a quantum communication channel and the communication between the entity server 322 and the primary user device 324 may be a wireless communication channel.

As shown in block 312, the process flow 300 of this embodiment includes a distributed network. In some embodiments, the distributed network may include a decentralized blockchain network. For instance, and by way of non-limiting example, the distributed network may include a Hyperledger. In this way, the distributed network may include a permissioned network (e.g., where participating devices of the network are authenticated), a distributed ledger (e.g., where participating devices of the network maintain a copy of the record of all transactions), smart contracts (e.g., self-executing contracts capable of being executed across the network and recorded in the distributed ledger), interoperability (e.g., accommodates varying complexity across the network and/or transactions), and/or the like.

As shown in block 314, the process flow 300 of this embodiment includes one or more fabric clients. In some embodiments, the fabric client may be a modular component in the distributed network which simulates each unique secondary user device (e.g., smart card) associated with one or more users. In some embodiments, the fabric client may invoke chaincode transactions, query the ledger, perform channel management, manipulate membership services, and/or the like.

As shown in block 316, the process flow 300 of this embodiment includes a transaction defining contract. In some embodiments, the transaction defining contracts may be defined by a financial institution to fulfill financial securities and process which financial securities are required to initiate the transaction. In some embodiments, the transaction defining contract may include rules associated with the transaction such as the sending account must have adequate balance to cover the transaction, the receiving account must be a valid account, the transaction must be initiated by the owner (e.g., user) of the sending account. In some embodiments, if the rules of the transaction defining contract are not met, the transaction may be aborted (e.g., cancelled).

As shown in block 318, the process flow 300 of this embodiment includes a transaction invoking contract. In some embodiments, the transaction invoking contract may include contracts required to initiate the transaction between secondary user devices (e.g., smart cards). For instance, and by way of non-limiting example, the transaction invoking contract may include requiring authentication of a user who is a party to a particular transaction. In some embodiments, the transaction invoking contracts may initiate the transactions based on the rules of the transaction defining contract 316.

As shown in block 320, the process flow 300 of this embodiment includes peer to peer (P2P) communications. In some embodiments, the P2P communications enables decentralized and distributed network architecture, allowing for efficient resource utilization (e.g., computing resources, network resources, memory resources, storage resources, and/or the like). In some embodiments, the P2P allows for scalability of the authentication determination system to allow for any number of peers (e.g., users, clients, entities, devices, and/or the like) to interact with the network.

As shown in block 322, the process flow 300 of this embodiment includes an entity server. In some embodiments, the entity server may be associated with a financial institution. In some embodiments, the entity server may be associated with the trusted communication channel 310. In some embodiments, the entity server may interact with the distributed network 312 and the primary user device 324. In some embodiments, the distributed network 312 may transmit and receive information relating to the authentication of the secondary user devices (e.g., secondary user device 1 304, secondary user device 2 306, etc.) to the entity server 322. In some embodiments, the entity server 322 may transmit and receive information from the primary user device 324.

As shown in block 324, the process flow 300 of this embodiment includes a primary user device. In some embodiments, the primary user device may include a mobile phone. In this way, the user may interact with the mobile phone (e.g., primary user device 324) to transmit and receive information relating to the transaction.

As shown in block 326, the process flow 300 of this embodiment includes transaction details. In some embodiments, the transaction details may include details of the transaction in question. In this way, the user may input the transaction details 326 in the primary user device 324 to complete the transaction. In some embodiments, the transaction details may include details relating to the amount of resources to be transferred, the party receiving the resource transfer, the devices (e.g., primary user device, secondary user device, and/or the like) associated with the party receiving the resource transfer, and/or the like. In some embodiments, the user may select the party receiving the resource transfer on the primary user device 324.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for authentication of device transfers in a distributed network, the system comprising:
   a processing device;
   a non-transitory storage device containing instructions when executed by the processing device, causes the processing device to perform the steps of:
   receive a transaction request, wherein the transaction request comprises a secondary user device, wherein the secondary user device is associated with a user;
   create a pair of authentication codes, wherein the authentication codes are associated with a distributed network;
   transmit the pair of authentication codes to the secondary user device;
   authorize the secondary user device;

activate a primary user device, wherein the primary user device is associated with the user, and wherein activating the primary user device comprises prompting the user on the primary user device to provide one or more transaction details; and complete the transaction request.

2. The system of claim 1, wherein activating the primary user device further comprises:
requesting the transaction details, wherein the transaction details are associated with the transaction request;
receiving the transaction details; and
transmitting the transaction details to an entity server.

3. The system of claim 1, wherein executing the instructions further causes the processing device to utilize one or more quantum communication channels when receiving and transmitting information.

4. The system of claim 1, wherein receiving the transaction request comprises receiving the transaction request through light fidelity, wherein the light fidelity comprises a light fidelity device, and wherein the secondary user device comprises a smart card.

5. The system of claim 4, wherein the light fidelity device comprises the primary user device.

6. The system of claim 1, wherein creating the pair of authentication codes further comprises requesting, from the user, one or more authentication credentials.

7. The system of claim 1, wherein the pair of authentication codes will expire after an expiration time period has elapsed.

8. A computer program product for authentication of device transfers in a distributed network, the computer program product comprising at least one non-transitory computer-readable medium having computer-readable program code portions embodied therein, the computer-readable program code portions comprising:
an executable portion configured to receive a transaction request, wherein the executable portion configured to receive the transaction request comprises a secondary user device, wherein the secondary user device is associated with a user;
an executable portion configured to create a pair of authentication codes, wherein the authentication codes are associated with a distributed network;
an executable portion configured to transmit the pair of authentication codes to the secondary user device;
an executable portion configured to authorize the secondary user device;
an executable portion configured to activate a primary user device, wherein the primary user device is associated with the user, and wherein activating the primary user device comprises prompting the user on the primary user device to provide one or more transaction details; and
an executable portion configured to complete the transaction request.

9. The computer program product of claim 8, wherein activating the primary user device further comprises:
requesting the transaction details, wherein the transaction details are associated with the transaction request;
receiving the transaction details; and
transmitting the transaction details to an entity server.

10. The computer program product of claim 8, wherein executing the instructions further causes the processing device to utilize one or more quantum communication channels when receiving and transmitting information.

11. The computer program product of claim 8, wherein receiving the transaction request comprises receiving the transaction request through light fidelity, wherein the light fidelity comprises a light fidelity device, and wherein the secondary user device comprises a smart card.

12. The computer program product of claim 11, wherein the light fidelity device comprises the primary user device.

13. The computer program product of claim 8, wherein creating the pair of authentication codes further comprises requesting, from the user, one or more authentication credentials.

14. The computer program product of claim 8, wherein the pair of authentication codes will expire after an expiration time period has elapsed.

15. A computer-implemented method for authentication of device transfers in a distributed network, the computer-implemented method comprising:
receiving a transaction request, wherein the transaction request comprises a secondary user device, wherein the secondary user device is associated with a user;
creating a pair of authentication codes, wherein the authentication codes are associated with a distributed network;
transmitting the pair of authentication codes to the secondary user device;
authorizing the secondary user device;
activating a primary user device, wherein the primary user device is associated with the user, and wherein activating the primary user device comprises prompting the user on the primary user device to provide one or more transaction details; and
completing the transaction request.

16. The computer-implemented method of claim 15, wherein activating the primary user device further comprises:
requesting the transaction details, wherein the transaction details are associated with the transaction request;
receiving the transaction details; and
transmitting the transaction details to an entity server.

17. The computer-implemented method of claim 15, wherein executing the instructions further causes the processing device to utilize one or more quantum communication channels when receiving and transmitting information.

18. The computer-implemented method of claim 15, wherein receiving the transaction request comprises receiving the transaction request through light fidelity, wherein the light fidelity comprises a light fidelity device, and wherein the secondary user device comprises a smart card.

19. The computer-implemented method of claim 18, wherein the light fidelity device comprises the primary user device.

20. The computer-implemented method of claim 19, wherein creating the pair of authentication codes further comprises requesting, from the user, one or more authentication credentials.

* * * * *